Figure 1:
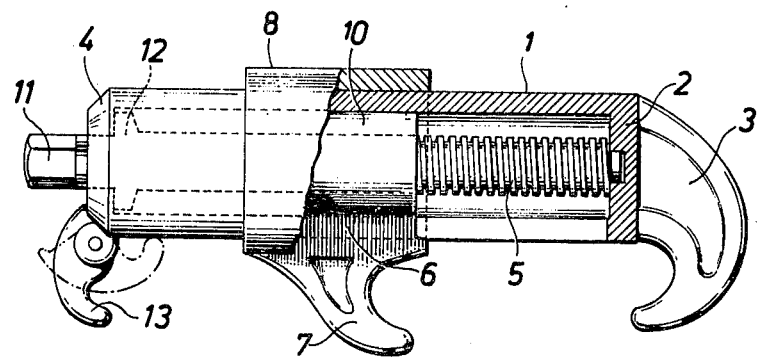

United States Patent [19]

Hasselås

[11] 4,157,171
[45] Jun. 5, 1979

[54] TENSIONING DEVICE FOR CHAINS, WIRE ROPES ETC.

[75] Inventor: Kjell Hasselås, Handen, Sweden

[73] Assignee: Seasafe Transport AB, Stockholm, Sweden

[21] Appl. No.: 825,412

[22] Filed: Aug. 17, 1977

Related U.S. Application Data

[63] Continuation of Ser. No. 735,599, Oct. 26, 1976, abandoned.

[51] Int. Cl.² .............................................. B66F 3/10
[52] U.S. Cl. ........................................................ 254/67
[58] Field of Search ................... 254/67, 83, 98, 100, 254/10.5; 24/68 CD, 68 CT

[56] References Cited

U.S. PATENT DOCUMENTS

| | | | |
|---|---|---|---|
| 1,489,123 | 4/1924 | Heatherington | 254/67 |
| 2,382,447 | 8/1945 | Schaeufebe | 254/67 |
| 2,884,225 | 4/1959 | Ford | 254/98 |
| 3,747,895 | 7/1973 | Martin | 254/10.5 |
| 3,980,275 | 9/1976 | Sanchez | 254/100 |

Primary Examiner—Robert C. Watson

[57] ABSTRACT

Tensioning device for chains etc. for lashing, for example, rolling cargo on ships' decks, comprising an oblong housing with a chain- or wire-rope-fastening device at one end, a threaded spindle journalled inside the housing, and on the spindle a non-rotatable sliding piece movable on rotation of the threaded spindle in the longitudinal direction of the housing and guided in it, the sliding piece projecting, with a part fitted with another chain- or wire-rope-fastening device, radially from a longitudinal slot in the housing, the which part is connected with a tubular element longitudinally displaceable on the housing, said tensioning device being able to be brought by means of said chain- or wire-rope-fastening devices at the side of a chain or wire rope for tensioning it, the threaded spindle owing inter alia to its being designed with low pitch on the gear reducton principle and to its bearing against the end of the housing by means of a collar, and owing to its drive connection on the housing in the form of a preferentially parallelepipedic power connection, unimpeded by the chain, for working with a motor-driven, preferentially pneumatically driven unit, so permitting rapid actuation of the tensioning device and a large tensional force during loading and discharging.

11 Claims, 4 Drawing Figures

TENSIONING DEVICE FOR CHAINS, WIRE ROPES ETC.

This is a continuation of U.S. Application, Ser. No. 735,599, filed Oct. 26, 1976 now abandoned.

When using chains there is very often a need to be able to tension them. The same applies to wire ropes with and without eyelets, to rods, etc. For this purpose a large number of tensioning devices are known, which work on the leverage principle. To achieve a reasonably great tensional force there must be a given minimum length of lever, so that the length of such devices has a given relation to the attainable tensional force. This means that comparatively bulky tensioning devices are required, for example, for lashing of heavy loads on rail cars or ships' decks.

Tensioning devices are known also for tensioning a chain or wire rope, being attached to one end of the chain or wire rope and consisting of an oblong housing with at one end a chain- or wire-rope-fastening device, and inside the housing a threaded spindle journalled in both ends of the housing and terminating in a crank at the end remote from the chain, and between the housing and threaded spindle a non-rotatable sliding piece projecting radially from a longitudinal slot in the housing and having an internally threaded portion in engagement with the threaded spindle, the projecting portion of which being devised to grip the object against which the chain is to be tensioned.

A disadvantage of these known tensioning devices is that, owing to the large torque exerted by the crank by reason of the considerable pitch of the screw, they tend to rotate the entire housing, which must therefore be held in position from outside by a dolly.

Furthermore the crank or, if used, an adjustable wrench requires space radially. With such a device, therefore, one cannot advantageously draw together, for example, the ends of two chains or wire ropes nor place such a tensioning device at the side of a chain or wire rope.

The object of the present invention is to produce a new tensioning device for chains, wire ropes, etc., which is short in relation to the applicable tensional force, requires minimal space laterally, and permits a large length of stretch in relation to the length of the tensioning device.

This is achieved according to the invention for a tensioning device of the aforesaid kind chiefly through the fact that the threaded spindle, by being made with low pitch, exerts little torque on the housing during rotation of the spindle, that the housing can thus be made narrow, and that the spindle is arranged to be driven by a motor unit connected to the drive connection in the form of a power connection, the motor unit being possibly formed integral with the housing. The housing may in such case appropriately have the form of a narrow cylinder. An arrangement of this kind permits rapid actuation of the tensioning device during loading and discharging, since it will act as a gear reduction device, placed on the chain or wire rope, for a motor unit.

The small lateral dimensions of the housing and the fact that the tensioning device is driven by a motor which can have the same diameter as the housing, permit rapid and convenient drawing together of the ends of the two chains or wire ropes or tensioning of a chain or wire rope.

The invention also results in a compact, robust and universally usable tensioning device.

The invention will now be described with reference to the attached drawings, where FIG. 1 shows a tensioning device according to the invention viewed from the side and partly cut away, FIG. 2 a cross-section through the tensioning device, FIG. 3 a longitudinal section through one end of the tensioning device, and FIG. 4 a chain with, at its side, a tensioning device according to the invention with associated motor.

Figure 2:
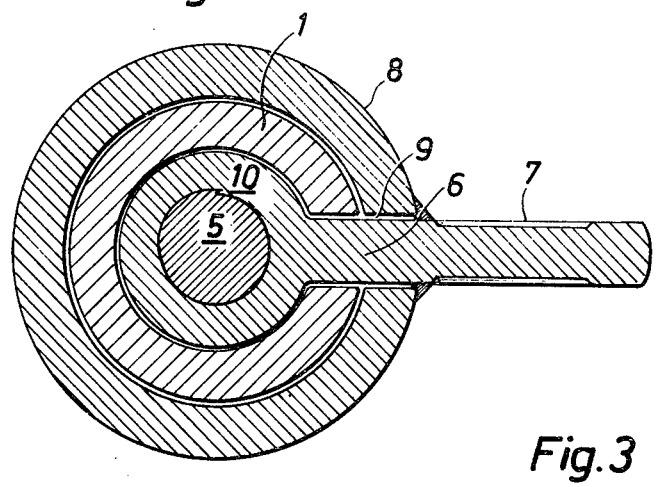
Figure 3:
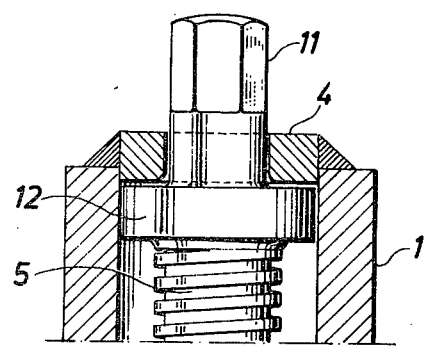

As appears from FIGS. 1 and 2, the tensioning device according to the invention consists of an oblong, cylindrical housing 1. At its closed end 2 there is a first chain hook 3 for attachment to a chain or wire rope. Inside the housing 1 there is journalled a threaded spindle 5 which projects out of the housing 1 at the other end 3 of the housing 1. On the threaded spindle 5 there is a non-rotatable sliding piece, which in its entirety is denoted by 6. It projects out of a longitudinal slot 9 in the housing 1 and has a tubular element 8 carrying a second chain hook 7 and gripping the housing 1 in a longitudinally displaceable manner, and inside the cylindrical housing 1 an internally threaded portion 10 in engagement with the thread of the spindle 5. The tubular element 8 has slight clearance with the housing 1, and the internally threaded portion 10 lies with slight clearance inside the housing 1. In engagement with a chain the chain hooks 3 and 7 provide the entire tensioning device with sufficient resistance to the moderate torques to which it is subjected by the driving motor.

Through an unnumbered journal the threaded spindle 5 is journalled also in the hooked end 2 of the housing. As mentioned, the end 11 of the threaded spindle 5 projecting from the housing 1 is made as a power connection for motor drive, for example by means of a pneumatic motor. Inside the housing 1 the threaded spindle has at the shoulder 4 a collar 12 which can take up axial forces by bearing against the inside of the shoulder 4. This is seen especially in FIG. 3.

In FIG. 1 another item is shown which enables a chain tensioned by the tensioning device according to the invention to be kept in tensioned state while tensioning device is being released by turning it in the reverse direction and then brought back into engagement with the chain for continued tensioning. For this purpose, in the embodiment here shown, there is a third chain hook 13 situated essentially in the same plane as the two other hooks 3 and 7. In order not to be in the way when the chain is tensioned with the tensioning device, the third hook 13 is made lowerable in the direction towards the two other hooks. Instead of hooks one can, of course, arrange for this purpose wire-rope-fastening devices of known kind, e.g. wedge-lock, toggle fastener or the like.

Figure 4:
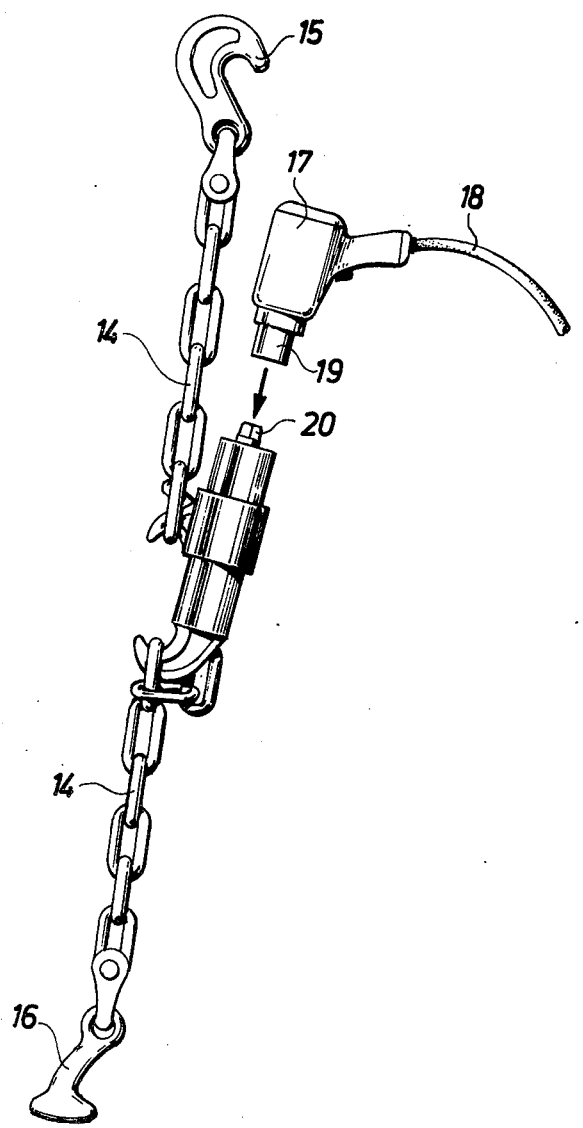

FIG. 4, finally, shows a tensioning device according to the invention in a practical application. A chain 14 has at one end a hook 15, which can be secured in, for example, an eyelet on a lorry to be lashed on a ship's deck. The other end of the chain is secured by means of an "elephant foot" 16 in an opening for the purpose in the ship's deck. When the ends 15, 16 of the chain have been secured, one hook of the tensioning device is placed in a link of the chain, after which the chain is tensioned by hand and the other hook is inserted in the adjoining link. The hooks of the tensioning device are then brought closer together by turning the threaded spindle in the aforesaid manner until the chain has been subjected to the desired tension by a motor 17 pneumatically driven through a compressed air hose 18. For this purpose the drive socket 19 of the motor 17 is fitted to the drive connection 20 of the tensioning device.

The invention is very advantageous since it provides a tensioning device of very compact and space-saving form and of especially short length in relation to the attainable length of stretch. The attainable tensional force is also very great in relation to the length of the device. The tensioning device is moreover extremely robust and hard-wearing, it being observable especially that the most delicate part of the device, i.e. the threaded spindle is well protected inside the cylindrical housing. A lorry can be driven over the tensioning device without damaging it. Finally, the tensioning device takes up little space either in use for tensioning or when stowed away after use, which is an advantage also for transport and stocking of the tensioning device.

What is claimed is:

1. A tensioning device for chains and the like comprising an elongated hollow casing closed at each end and having a longitudinal slot formed in the wall thereof, a first hook member secured fixedly at one end of said casing and extending radially therefrom, a slidable body located in said casing, a second hook member integral with said body extending outwardly of said slot in opposition to said first hook member, screw means threadedly extending through said slidable body, said screw means extending outwardly of the end of said casing opposite said first hook member and having means for engagement with a power drive means, and a slidable sleeve surrounding said casing and integrally attached to said second hook member thereby resisting torque reaction between said casing and said slidable body.

2. The device according to claim 1 wherein said screw means comprises an elongated spindle helically threaded along its length and journalled in each end of said casing, the pitch of said thread being so small that the spindle and body have a self-braking reaction.

3. The device according to claim 1, in which the casing and sleeve are cylindrical.

4. The device according to claim 1, in which said body and said sleeve have minimum sliding clearance with respect to said casing.

5. The device according to claim 2, in which said spindle is provided with a radial collar abutting the inner surface of the end of said casing to take up the axial force resulting from rotation of said spindle.

6. The device according to claim 1, including a third hook member secured to said casing between the second hook member and the end of said casing opposite the first hook member, said second hook member being arranged in opposition to said first hook member in the plane of said first and second hook member and pivotal about an axis perpendicular to said plane.

7. A tensioning device for chains and the like comprising an elongated hollow casing closed at one end and having a longitudinal slot formed in the wall thereof, a first hook member secured fixedly at one end of said casing and extending therefrom, a slidable body located in said casing, a second hook member integral with said body extending outwardly of said slot, screw means threadedly extending through said slidable body, said screw means extending outwardly of the end of said casing and having means for engagement with a power drive means, and a slidable sleeve surrounding said casing and integrally attached to said second hook member thereby resisting reaction between said casing and said slidable body.

8. A tensioning device for chains and the like comprising in combination:
   an elongated hollow first support member having openings in the opposed axial ends thereof;
   a first grasping element secured fixedly to said first support member for engagement with a link in a chain or the like;
   a second support member for a second grasping element said second support member being positioned slidably within said first support member and projecting through at least the opening in one end thereof;
   a second grasping element securef fixedly to said second support member adapted for engagement with a chain link spaced from the link engageable by said first grasping element;
   and axially extending screw means operatively connected to said first support member having one end thereof extending through the opening in the other end thereof, said one end of the screw means being engageable by drive means for rotation of the screw means and relative axial displacement between said first support member and first grasping element and said second support member and second grasping element thereon a longitudinal slot formed in said second support member and a slide member reciprocable therewithin having a threaded bore cooperable with threads of said screw means, said first support member comprising an integral plane extension of said reciprocable slide member.

9. A tensioning device according to claim 8, wherein said first and second support members are cylindrical.

10. A tensioning device according to claim 8, wherein the pitch of said threads is sufficiently low to produce a self-braking reaction between said screw means and said reciprocable slide member.

11. A tensioning device according to claim 8, including a third grasping element secured pivotably to said second support member at a location such that said first grasping element is intermediate said second and third grasping elements.

* * * * *